United States Patent
Wills (10) Patent No.: US 9,500,187 B2
(45) Date of Patent: *Nov. 22, 2016

(54) METHOD, SYSTEM AND PROGRAM PRODUCT OPERABLE TO RELAY A MOTION DETECTOR ACTIVATION

(71) Applicant: Theodore S. Wills, Pittsburgh, PA (US)

(72) Inventor: Theodore S. Wills, Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/171,660

(22) Filed: Feb. 3, 2014

(65) Prior Publication Data
US 2015/0219080 A1    Aug. 6, 2015

(51) Int. Cl.
*G08B 29/00* (2006.01)
*F03G 7/06* (2006.01)
*H05B 1/02* (2006.01)

(52) U.S. Cl.
CPC ............. *F03G 7/065* (2013.01); *H05B 1/0227* (2013.01)

(58) Field of Classification Search
CPC .................... G08B 13/1961; G08B 13/19602; G08B 13/1436; G08B 13/22
USPC .................... 340/515, 506, 541, 565; 342/28
See application file for complete search history.

(56) References Cited

U.S. PATENT DOCUMENTS

| | | | |
|---|---|---|---|
| 5,823,844 A | 10/1998 | Markowitz | |
| 7,411,504 B2 | 8/2008 | Hanscom | |
| 2003/0136908 A1* | 7/2003 | Pfister et al. | G08B 13/19 250/338.1 |
| 2008/0036595 A1* | 2/2008 | Hollstien et al. | G08B 13/00 340/541 |
| 2010/0214410 A1* | 8/2010 | McClure et al. | G08B 13/1961 348/143 |
| 2011/0227779 A1* | 9/2011 | Harrington | G01S 7/497 342/28 |

* cited by examiner

*Primary Examiner* — Phung Nguyen
(74) *Attorney, Agent, or Firm* — Ariel S. Bentolila; Bay Area IP Group LLC (57) ABSTRACT

A method, system and program product comprise receiving an activated signal from a first motion detector. The activated signal indicating an object is detected by the first motion detector. A source of heat is applied to a heatable object for a first predetermined period of time in response to the receiving. The applying is conveyed by a terminal device. The heatable object is positionable within a sensing range of a second motion detector. The applying of the heat source is stopped for a second predetermined period of time. The stopping enables the heatable object to cool in which a cycle of the applying and the stopping with motion of said heatable object is detectable by the second motion detector wherein the detection by the first motion detector is relayed to the second motion detector.

20 Claims, 5 Drawing Sheets

METHOD, SYSTEM AND PROGRAM PRODUCT OPERABLE TO RELAY A MOTION DETECTOR ACTIVATION

RELATED CO-PENDING U.S. PATENT APPLICATIONS

Not applicable

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to motion detection. More particularly, the invention relates to remote activation of motion detection.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Many motion detecting devices may be capable of tracking motion of various objects, including humans, animals, and vehicles. However, it may be difficult to manually activate, or trigger, such devices without a human, animal, or vehicle entering a detection range. In many situations, it may be valuable for users to be able to manually activate, or trigger, a motion detecting device from a distance. Such an ability may allow users to check on an area or ensure that the motion detecting device may be functional.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. One aspect in the prior art shows an electromagnetic signal transmitted in a form of a beam and configured to activate a motion detector when the beam encounters the motion detector. By way of educational background, another aspect of the prior art generally useful to be aware of teaches of a series of devices designed to scare away animals through a combination of a motion detection system which triggers an auditory and/or movement response and fanciful creatures. Still another aspect of the prior art generally useful to be aware of discloses a vibrating toy including a housing, a battery mounted within the housing, a motor mounted within the housing activated by the battery, a shaft driven by the motor, a mechanism on the shaft for imparting an eccentric vibration from the housing, a play element outside of the housing, and a mechanism for connecting the play element to the housing and through which the play element can receive vibrations generated from the mechanism that imparts the eccentric vibration. However, these solutions may not allow users to manually activate motion detecting devices from a distance. A solution that allowed remote activation of a motion detecting device would be desirable.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Some embodiments of the present invention may provide means and methods for testing and controlling of motion detectors. In many embodiments, any motion detector may be suitable, including, without limitation, passive infrared motion detectors.

In some embodiments, a heating element may transfer heat to a heatable object by means of, without limitation, thermal radiation and/or thermal conduction. In some of these embodiments, heating of the heatable object may cause the heatable object to move. In a non-limiting example, a heating element may be a battery and a heatable object may be a nickel titanium (nitinol) wire or other shape memory alloy. In some embodiments, the heating element may include a resistive element such, but not limited to, as a resistor that heats up when a current is passed through it. In some embodiments, movement of the heatable object may be sufficient to activate a motion detector device. In alternative embodiments, a heatable object may not move independently, but may instead be caused to move by an external moving object. In some embodiments, a user may use a controller to control the heating element and/or the heatable object. In alternative embodiments, user may use a controller to control an external object which may cause movement in the heatable object. In some embodiments, controller may control an object remotely, by means of a wired and/or wireless connection. In other embodiments, controller may be a switch or other controlling means attached to a controlled object.

Figure 1:
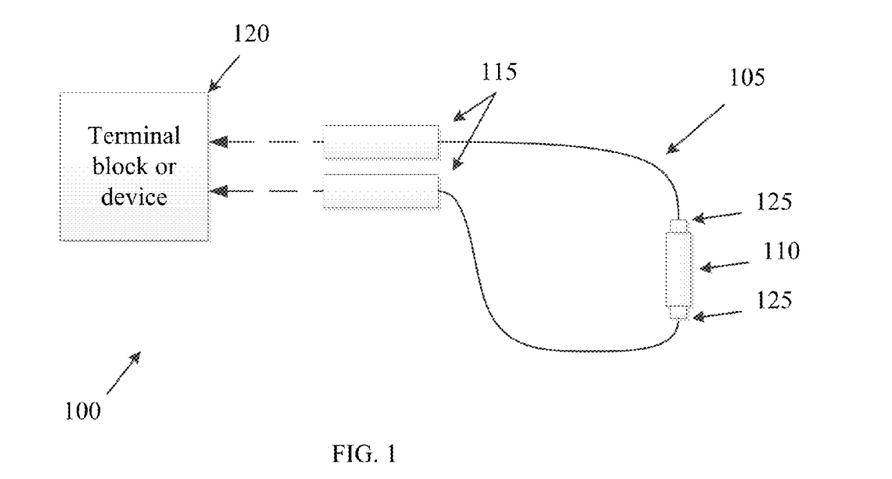
FIG. 1 is an illustration of an exemplary system for controlling motion detectors, in accordance with an embodiment of the present invention.

FIG. 1 is an illustration of an exemplary system for controlling motion detectors, in accordance with an embodiment of the present invention. In the present embodiment, heatable objects may be nitinol wires 105. In some embodiments, nitinol wires 105 may tense up or move when heated and may return to a pre-heating position when cooled. In the present embodiment, a resistor may be the heatable object. Its heat (when put into motion by the phase changing of the nitinol wires) is what the motion detector detects. The electrical current that passes through the nitinol wire is what causes the nitinol wire to heat up and tense, wherein this phase changing provides usable motion. In the present embodiment, the resistor is not intended to heat the nitinol wire, but instead acts as a selectively movable heat source. In the present embodiment, a resistor 110 may be connected to the nitinol wires 105 as a means of providing a source of heat for the motion detector to detect 105. In a non-limiting example, a suitable resistor may have a resistance of 4.7 ohms and a power rating of ¼ watt. In other embodiments, the resistor may range in value from 1 ohm to 100 ohms and may have a power rating of 0.1 watt up to 10 watts. In some embodiments, the resistor dissipate more power than the rating for a short period of time. In many embodiments, the resistance value and the power rating is chosen to result in a small lightweight resistor that heats up quickly. In some embodiments, copper crimps 125 may be used to connect the resistor 110 to the nitinol wires 105. In the present embodiment, the nitinol wires 105 may pass through copper capillary tubes 115. The copper capillary tubes 115 serve as a means of interfacing (crimping) from a very thin and unsolderable nitinol wire to terminal block 120. In other embodiments, various other types of interfacing may be used such as, but not limited to, butt splices, crimp terminals, etc. Further, in the present embodiment, the nitinol wires 105 may connect to a terminal block and/or terminal device 120 or other centralized wiring system. In a non-limiting example, the terminal block may be used to provide a convenient means for attaching the heatable object to a set of wires, to a controlling unit, or to a wired or wireless remote activation switch. In some embodiments, terminal block 120 may include a controlling unit or a wireless interface. In some embodiments, terminal block 120 may connect to or include a battery or other voltage source. In some embodiments, terminal block 120 may include an interface to a client/server system such as, but not limited to, a system shown in FIG. 3.

Figure 2:
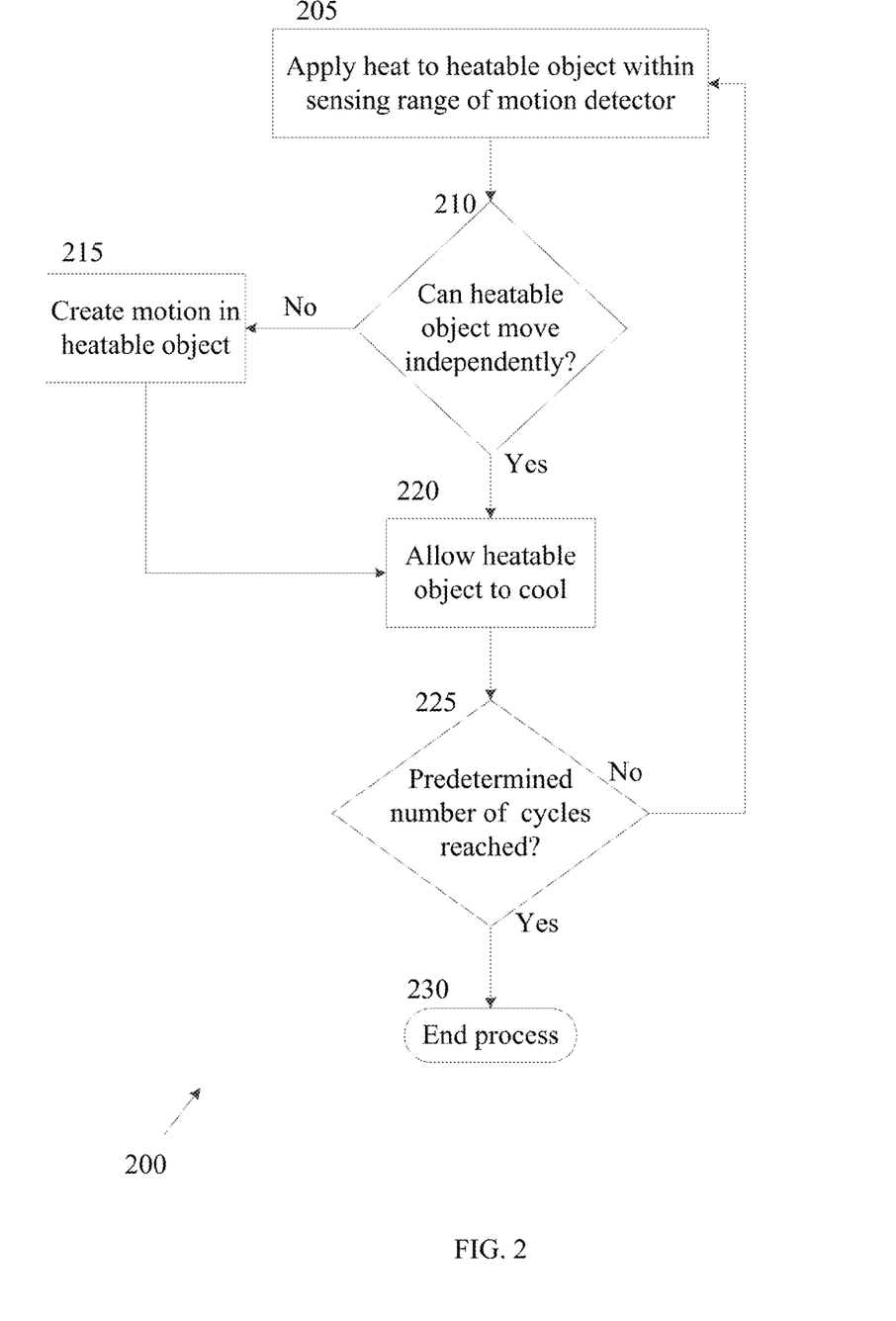
FIG. 2 is an illustration of an exemplary method for controlling and/or testing motion detecting devices, in accordance with an embodiment of the present invention.

FIG. 2 is an illustration of an exemplary method for controlling and/or testing motion detecting devices, in accordance with an embodiment of the present invention. In the present embodiment, a user may apply heat to a heatable object 105 within a sensing range of a motion detector in a step 205. Some embodiments of the present invention may have different components depending on whether a heatable object 105 may be capable of independent movement, as illustrated in a step 210. In some embodiments, suitable objects capable of independent movement may include, without limitation, bimetal strips or wires, flexinol, "muscle wires", shape memory alloys, shape memory polymers, solenoids, electroactive polymers, etc. In alternative embodiments, any other objects capable of independent movement with application of heat may be suitable, including, without limitation, popcorn kernels or explosive devices such as fireworks. In the present embodiment, if a heatable object is not capable of independent movement, a user may create motion in the heatable object through, without limitation, electrical or mechanical means in a step 215. In a non-limiting example, a user may remotely control an external object, such as a metallic arm, to contact the heatable object, causing the heatable object to move. In another non-limiting example, a user may remotely control the heatable object itself, causing the heatable object to move. In some embodiments, suitable means for causing motion may include, without limitation, electrical motors, air driven motors, and servomotors. In many embodiments, a control unit such as, without limitation, an electronic control module or an electromechanical timer. In some embodiments, a control unit may be connected to any switch or button, alarm output, dvr output, or motion detector. In many embodiments, connections may be wired or wireless. In the present embodiment, heating of heatable object may stop for a period of time to allow cooling of the nitinol wire to cool and relax, thus provide motion and isn't necessary if any other means of propulsion is utilized such as the gear motor example, etc., in a step 220. In a non-limiting example, a heating period may be six seconds and a cooling period may also be six seconds. In some embodiments, each period may be controlled by a timing mechanism. In alternative embodiments, a cooling element, such as, without limitation, a fan, may be activated during a cooling period. In many embodiments, system may have a predetermined number of cycles. In many embodiments, system may operate in an "open loop process" and have a predetermined number of cycles regardless of activation of the motion detector. In other optional embodiments, system may be alerted when a motion detector is activated. In the present embodiment, system may determine whether predetermined number of cycles has been reached in a step 225. Further, in the present embodiment, if a predetermined number of cycles has not been reached, system may repeat from step 205. In the present embodiment, if a predetermined number of cycles has been reached, process may end in a step 230.

In some embodiments, timer circuitry may involve multiple timer elements. In some of these embodiments, a first timer may be, without limitation, an adjustable interval monostable multivibrator that may provide a total activation time. In some embodiments, a second timer may be an adjustable interval astable timer that may provide a signal directly to an ouput control circuitry which may in turn provide power to a heatable object and heating element assembly. In a non-limiting example, a switching element such as a metal-oxide-semiconductor field-effect transistor (MOSFET) may be used to control power to a heatable object. In some embodiments, other switch elements such as a relay, bi-polar transistor or field-effect transistor may be suitable. In some embodiments, timers and/or switch elements may be included in terminal block 120.

In many embodiments, various electronic control components may be suitable for controlling components of a system, including, without limitation, input interface circuitry, timer circuitry, and output control circuitry.

In other embodiments, a gear motor may be used to provide activation of various system components. In a non-limiting example, a gear motor may provide appropriate motion to a heatable object that would be situated in front of the user's motion detector. In some embodiments, a weight and/or pivot may be included in a system to provide balance to components of the system. In a non-limiting example, a weight and pivot may be used in conjunction with a cam that is affixed to the gear motor's output shaft to convert the gear motor's rotary motion into a back and forth linear motion.

In some embodiments, suitable heating elements may include, without limitation, resistors, hot air jets, reflectors, interrupters, heaters, and flames.

In some embodiments in which a heatable object may be a wire, the wire may be wrapped around a motion detector sensing element or otherwise situated so as to be within sensing range of the sensing element.

Some embodiments of the present invention may be powered by a motion detector device or other electronic device. In a non-limiting example, security lights associated with a motion detecting device may provide power to embodiments of the present invention. Some of these embodiments may be powered by rechargeable batteries. In some of these embodiments, rechargeable batteries may be powered by components of motion detecting device or other electronic devices. Other embodiments may be powered by disposable batteries.

In some embodiments, a motion detector device may be connected to a transmitting means. In some of these embodiments, the transmitting means may be capable of transmitting a wired and/or wireless signal which may be received by a motion detector activation device.

Figure 3:
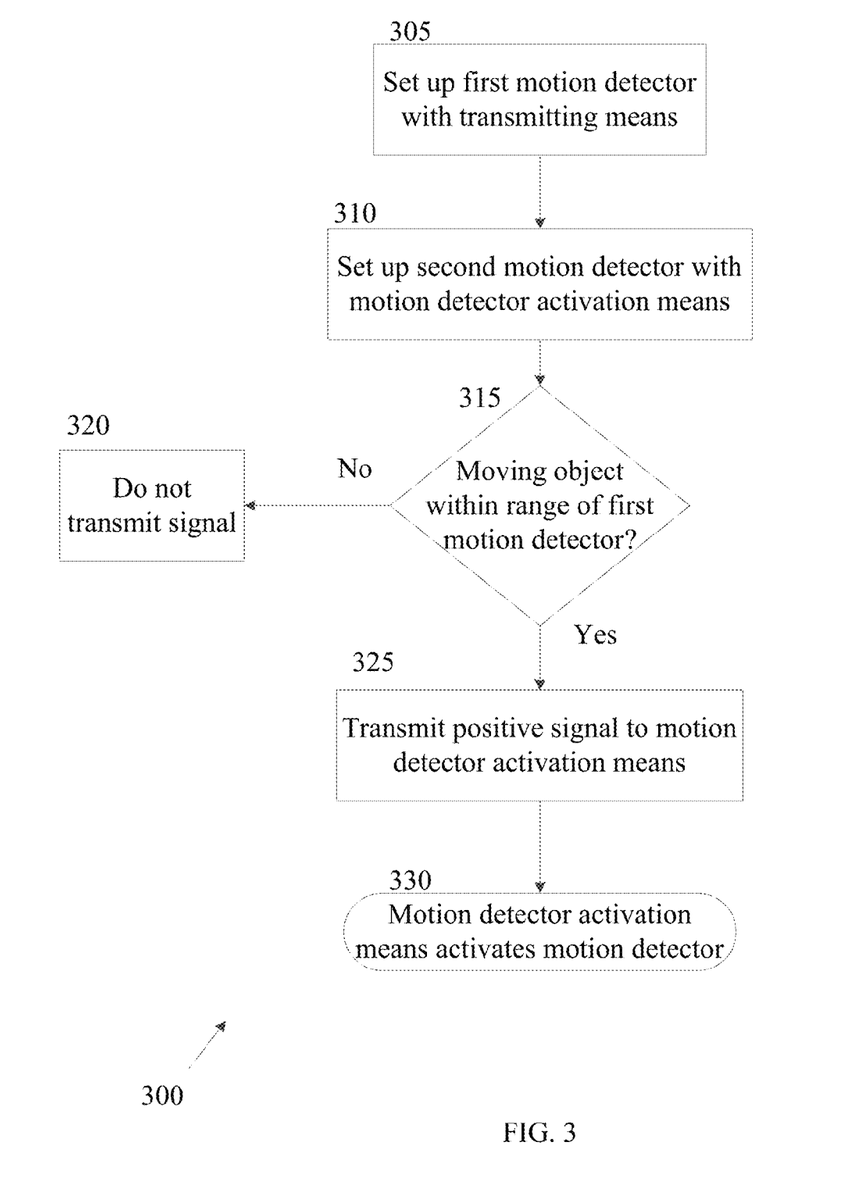
FIG. 3 is an illustration of an exemplary method for automatically activating a motion detector activation device, in accordance with an embodiment of the present invention.

FIG. 3 is an illustration of an exemplary method for automatically activating a motion detector activation device, in accordance with an embodiment of the present invention. In the present embodiment, a user may set up a first motion detector device capable of transmitting signals in a step 305. In some embodiments, transmitting means may be any means suitable to transmit an electromagnetic signal to a motion detector activation device. In the present embodiment, user may set up a second motion detector device with motion detector activation means as previously described in a step 310. In some embodiments, motion detector activation means may be designed to receive wired and/or wireless signals. In the present embodiment, first motion detector device may scan for moving objects in a step 315. Further, in the present embodiment, if no moving objects are found, first motion detector device may not transmit a signal in a step 320. In other embodiments, first motion detector device may transmit a negative signal if no moving objects are found. In the present embodiment, if a moving object is found, first motion detector device may transmit a positive signal in a step 325. Further, in the present embodiment, a motion detector activation means may receive the positive signal and activate a second motion detector device in a step 330.

In some embodiments, any number of motion detectors with transmitting means may transmit signals to any number of motion detector activation devices.

In other embodiments, a first motion detector activation means may have a transmitting means suitable to transmit a signal to a second motion detector activation means.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 4:
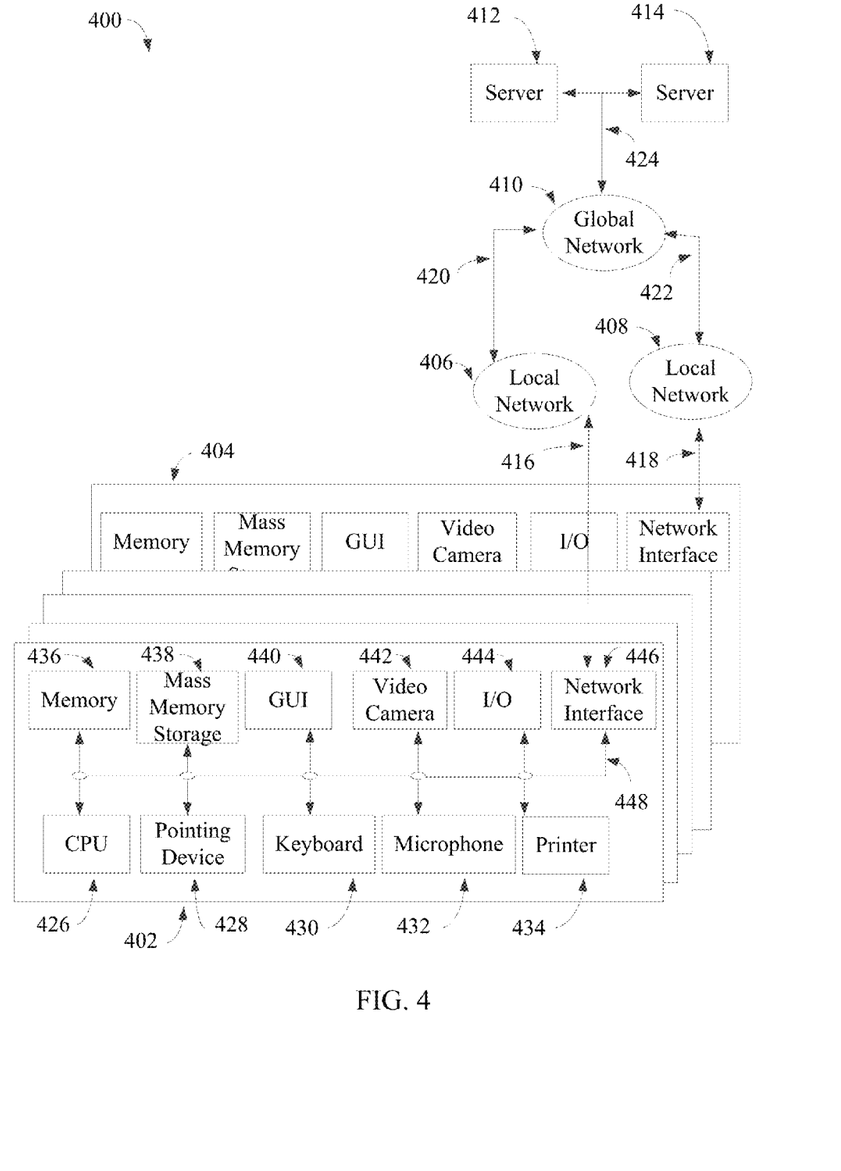
FIG. 4 is a block diagram depicting an exemplary client/server system which may be used by an exemplary web-enabled/networked embodiment of the present invention.

FIG. 4 is a block diagram depicting an exemplary client/server system which may be used by an exemplary web-enabled/networked embodiment of the present invention.

A communication system 400 includes a multiplicity of clients with a sampling of clients denoted as a client 402 and a client 404, a multiplicity of local networks with a sampling of networks denoted as a local network 406 and a local network 408, a global network 410 and a multiplicity of servers with a sampling of servers denoted as a server 412 and a server 414.

Client 402 may communicate bi-directionally with local network 406 via a communication channel 416. Client 404 may communicate bi-directionally with local network 408 via a communication channel 418. Local network 406 may communicate bi-directionally with global network 410 via a communication channel 420. Local network 408 may communicate bi-directionally with global network 410 via a communication channel 422. Global network 410 may communicate bi-directionally with server 412 and server 414 via a communication channel 424. Server 412 and server 414 may communicate bi-directionally with each other via communication channel 424. Furthermore, clients 402, 404, local networks 406, 408, global network 410 and servers 412, 414 may each communicate bi-directionally with each other.

In one embodiment, global network 410 may operate as the Internet. It will be understood by those skilled in the art that communication system 400 may take many different forms. Non-limiting examples of forms for communication system 400 include local area networks (LANs), wide area networks (WANs), wired telephone networks, wireless networks, or any other network supporting data communication between respective entities.

Clients 402 and 404 may take many different forms. Non-limiting examples of clients 402 and 404 include personal computers, personal digital assistants (PDAs), cellular phones and smartphones.

Client 402 includes a CPU 426, a pointing device 428, a keyboard 430, a microphone 432, a printer 434, a memory 436, a mass memory storage 438, a GUI 440, a video camera 442, an input/output interface 444 and a network interface 446.

CPU 426, pointing device 428, keyboard 430, microphone 432, printer 434, memory 436, mass memory storage 438, GUI 440, video camera 442, input/output interface 444 and network interface 446 may communicate in a unidirectional manner or a bi-directional manner with each other via a communication channel 448. Communication channel 448 may be configured as a single communication channel or a multiplicity of communication channels.

CPU 426 may be comprised of a single processor or multiple processors. CPU 426 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 436 is used typically to transfer data and instructions to CPU 426 in a bi-directional manner. Memory 436, as discussed previously, may include any suitable computer-readable media, intended for data storage, such as those described above excluding any wired or wireless transmissions unless specifically noted. Mass memory storage 438 may also be coupled bi-directionally to CPU 426 and provides additional data storage capacity and may include any of the computer-readable media described above. Mass memory storage 438 may be used to store programs, data and the like and is typically a secondary storage medium such as a hard disk. It will be appreciated that the information retained within mass memory storage 438, may, in appropriate cases, be incorporated in standard fashion as part of memory 436 as virtual memory.

CPU 426 may be coupled to GUI 440. GUI 440 enables a user to view the operation of computer operating system and software. CPU 426 may be coupled to pointing device 428. Non-limiting examples of pointing device 428 include computer mouse, trackball and touchpad. Pointing device 428 enables a user with the capability to maneuver a computer cursor about the viewing area of GUI 440 and select areas or features in the viewing area of GUI 440. CPU 426 may be coupled to keyboard 430. Keyboard 430 enables a user with the capability to input alphanumeric textual information to CPU 426. CPU 426 may be coupled to microphone 432. Microphone 432 enables audio produced by a user to be recorded, processed and communicated by CPU 426. CPU 426 may be connected to printer 434. Printer 434 enables a user with the capability to print information to a sheet of paper. CPU 426 may be connected to video camera 442. Video camera 442 enables video produced or captured by user to be recorded, processed and communicated by CPU 426.

CPU 426 may also be coupled to input/output interface 444 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 426 optionally may be coupled to network interface 446 which enables communication with an external device such as a database or a computer or telecommunications or internet network using an external connection shown generally as communication channel 416, which may be implemented as a hardwired or wireless communications link using suitable conventional technologies. With such a connection, CPU 426 might receive information from the network, or might output information to a network in the course of performing the method steps described in the teachings of the present invention.

Figure 5:
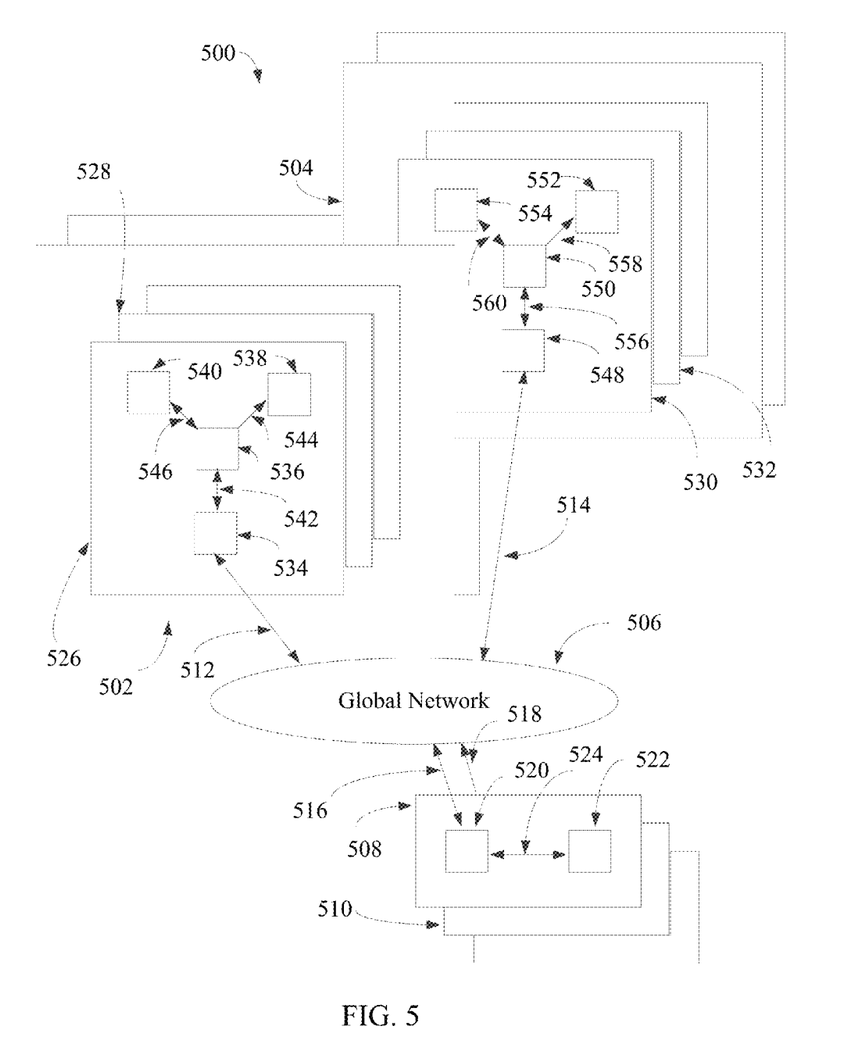
FIG. 5 illustrates a block diagram depicting a conventional client/server communication system.

FIG. 5 illustrates a block diagram depicting a conventional client/server communication system.

A communication system 500 includes a multiplicity of networked regions with a sampling of regions denoted as a network region 502 and a network region 504, a global network 506 and a multiplicity of servers with a sampling of servers denoted as a server device 508 and a server device 510.

Network region 502 and network region 504 may operate to represent a network contained within a geographical area or region. Non-limiting examples of representations for the geographical areas for the networked regions may include postal zip codes, telephone area codes, states, counties, cities and countries. Elements within network region 502 and 504 may operate to communicate with external elements within other networked regions or within elements contained within the same network region.

In some implementations, global network 506 may operate as the Internet. It will be understood by those skilled in the art that communication system 500 may take many different forms. Non-limiting examples of forms for communication system 500 include local area networks (LANs), wide area networks (WANs), wired telephone networks, cellular telephone networks or any other network supporting data communication between respective entities via hardwired or wireless communication networks. Global network 506 may operate to transfer information between the various networked elements.

Server device 508 and server device 510 may operate to execute software instructions, store information, support database operations and communicate with other networked elements. Non-limiting examples of software and scripting languages which may be executed on server device 508 and server device 510 include C, C++, C# and Java.

Network region 502 may operate to communicate bi-directionally with global network 506 via a communication channel 512. Network region 504 may operate to communicate bi-directionally with global network 506 via a communication channel 514. Server device 508 may operate to communicate bi-directionally with global network 506 via a communication channel 516. Server device 510 may operate to communicate bi-directionally with global network 506 via a communication channel 518. Network region 502 and 504, global network 506 and server devices 508 and 510 may operate to communicate with each other and with every other networked device located within communication system 500.

Server device 508 includes a networking device 520 and a server 522. Networking device 520 may operate to communicate bi-directionally with global network 506 via communication channel 516 and with server 522 via a communication channel 524. Server 522 may operate to execute software instructions and store information.

Network region 502 includes a multiplicity of clients with a sampling denoted as a client 526 and a client 528. Client 526 includes a networking device 534, a processor 536, a GUI 538 and an interface device 540. Non-limiting examples of devices for GUI 538 include monitors, televisions, cellular telephones, smartphones and PDAs (Personal Digital Assistants). Non-limiting examples of interface device 540 include pointing device, mouse, trackball, scanner and printer. Networking device 534 may communicate bi-directionally with global network 506 via communication channel 512 and with processor 536 via a communication channel 542. GUI 538 may receive information from processor 536 via a communication channel 544 for presentation to a user for viewing. Interface device 540 may operate to send control information to processor 536 and to receive information from processor 536 via a communication channel 546. Network region 504 includes a multiplicity of clients with a sampling denoted as a client 530 and a client 532. Client 530 includes a networking device 548, a processor 550, a GUI 552 and an interface device 554. Non-limiting examples of devices for GUI 538 include monitors, televisions, cellular telephones, smartphones and PDAs (Personal Digital Assistants). Non-limiting examples of interface device 540 include pointing devices, mousse, trackballs, scanners and printers. Networking device 548 may communicate bi-directionally with global network 506 via communication channel 514 and with processor 550 via a communication channel 556. GUI 552 may receive information from processor 550 via a communication channel 558 for presentation to a user for viewing. Interface device 554 may operate to send control information to processor 550 and to receive information from processor 550 via a communication channel 560.

For example, consider the case where a user interfacing with client 526 may want to execute a networked application. A user may enter the IP (Internet Protocol) address for the networked application using interface device 540. The IP address information may be communicated to processor 536 via communication channel 546. Processor 536 may then communicate the IP address information to networking device 534 via communication channel 542. Networking device 534 may then communicate the IP address information to global network 506 via communication channel 512. Global network 506 may then communicate the IP address information to networking device 520 of server device 508 via communication channel 516. Networking device 520 may then communicate the IP address information to server 522 via communication channel 524. Server 522 may receive the IP address information and after processing the IP address information may communicate return information to networking device 520 via communication channel 524. Networking device 520 may communicate the return information to global network 506 via communication channel 516. Global network 506 may communicate the return information to networking device 534 via communication channel 512. Networking device 534 may communicate the return information to processor 536 via communication channel 542. Processor 546 may communicate the return information to GUI 538 via communication channel 544. User may then view the return information on GUI 538.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6). In some embodiments, the methods and/or system components which may be located and/or performed remotely include, without limitation a client/server system.

It is noted that according to USA law, all claims must be set forth as a coherent, cooperating set of limitations that work in functional combination to achieve a useful result as a whole. Accordingly, for any claim having functional limitations interpreted under 35 USC §112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §112 (6) is/(are) dependent on one or more remote servers located outside the USA, it is intended that each such recited function under 35 USC §112 (6) is to be interpreted as the function of the local system receiving the remotely generated information required by a locally implemented claim limitation, wherein the structures and or steps which enable, and breath life into the expression of such functions claimed under 35 USC §112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing motion detector activation according to the present invention will be apparent to those skilled in the art. Various aspects of the invention have been described above by way of illustration, and the specific embodiments disclosed are not intended to limit the invention to the particular forms disclosed. The particular implementation of the motion detector activation may vary depending upon the particular context or application. By way of example, and not limitation, the motion detector activation described in the foregoing were principally directed to remote activation implementations; however, similar techniques may instead be applied to local activation, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising the steps of:
    receiving an activated signal from a first motion detector, said activated signal indicating an object being detected by the first motion detector;
    applying a source of heat to a heatable object for a first period of time in response to said receiving, said applying being conveyed by a terminal device, said heatable object being positionable within a sensing range of a second motion detector; and
    stopping said applying of said heat source for a second period of time, said stopping enabling said heatable object to cool in which a temperature induced motion change of said heatable object is detectable by the second motion detector wherein said detection by the first motion detector is relayed to the second motion detector.

2. The method as recited in claim 1, further comprising the step of controlling said cycle of said applying and said stopping for a predetermined number of cycles.

3. The method as recited in claim 2, in which said activated signal is received wirelessly.

4. The method as recited in claim 2, in which said heatable object at least comprises a nitinol wire for inducing a motion.

5. The method as recited in claim 4, in which said source of heat is generated by electrical power.

6. The method as recited in claim 5, in which said nitinol wire is coupled to a resistor.

7. The method as recited in claim 6, in which at least said nitinol wire is coupled to a terminal block, said terminal block being operable to convey said cycle of said applying and said stopping to said nitinol wire.

8. The method as recited in claim 5, in which said first predetermined period of time and said second predetermined period of time are each determined to induce a motion of said nitinol wire.

9. The method as recited in claim 1, in which said terminal device is further operable for communication with a computational system.

10. A system comprising:
    a heatable object being configured for placement within a sensing range of a second motion detector; and
    a terminal device being operable to convey an applying of heat to said heatable object for a first predetermined period of time, and to convey a stopping of said applying of said heat for a second predetermined period of time, said stopping enabling said heatable object to cool in which a cycle of said applying and said stopping with motion of said heatable object is detectable by a first motion detector, wherein said detection by the first motion detector is relayed to the second motion detector.

11. The system as recited in claim 10, in which said cycle of said applying and said stopping is controlled for a predetermined number of cycles.

12. The system as recited in claim 11, in which said activated signal is received wirelessly.

13. The system as recited in claim 11, in which said heatable object at least comprises a nitinol wire for inducing a motion.

14. The system as recited in claim 13, in which said heat is generated by electrical power.

15. The system as recited in claim 14, in which said nitinol wire is coupled to a resistor.

16. The system as recited in claim 15, in which said terminal device at least comprises a terminal block being coupled to said nitinol wire, said terminal block being operable to convey said cycle of said applying and said stopping to said nitinol wire.

17. The system as recited in claim 14, in which said first predetermined period of time and said second predetermined period of time are each determined to induce a motion of said nitinol wire.

18. The system as recited in claim 10, in which said terminal device is further operable for communication with a computational system.

19. A non-transitory computer-readable storage medium with an executable program stored thereon, wherein the program instructs one or more processors to perform the following steps:
receiving an activated signal from a first motion detector, said activated signal indicating an object being detected by the first motion detector;
applying a source of heat to a heatable object for a first predetermined period of time in response to said receiving, said applying being conveyed by a terminal device, said heatable object being positionable within a sensing range of a second motion detector; and
stopping said applying of said heat source for a second predetermined period of time, said stopping enabling said heatable object to cool in which a cycle of said applying and said stopping with motion of said heatable object is detectable by the second motion detector wherein said detection by the first motion detector is relayed to the second motion detector.

20. The program instructing the processor as recited in claim 19, further comprising the step of controlling said cycle of said applying and said stopping for a predetermined number of cycles, in which said activated signal is received wirelessly, said heatable object at least comprises a nitinol wire coupled to a resistor by copper crimps, at least said nitinol wire being coupled to a terminal block by copper capillary tubes, said terminal block being operable to convey said cycle of said applying and said stopping to said nitinol wire and resistor in which said source of heat is generated by electrical power, said first predetermined period of time and said second predetermined period of time each being determined to induce a motion of said nitinol wire.

* * * * *